(12) United States Patent
Duraisamy Soundrapandian et al.

(10) Patent No.: US 10,949,765 B2
(45) Date of Patent: Mar. 16, 2021

(54) AUTOMATED INFERENCE OF EVIDENCE FROM LOG INFORMATION

(71) Applicant: Accenture Global Solutions Limited, Dublin (IE)

(72) Inventors: Pradeepkumar Duraisamy Soundrapandian, Sivakasi (IN); Shrikanth Narayanaswamy Chandrasekaran, Bangalore (IN); Aditya Bhola, Jabalpur (IN); Venkatesh Subramanian, Bangalore (IN); Vikrant S. Kaulgud, Pune (IN); Sanjay Podder, Thane (IN)

(73) Assignee: Accenture Global Solutions Limited, Dublin (IE)

( * ) Notice: Subject to any disclaimer, the term of this patent is extended or adjusted under 35 U.S.C. 154(b) by 797 days.

(21) Appl. No.: 15/704,947

(22) Filed: Sep. 14, 2017

(65) Prior Publication Data

US 2018/0075363 A1 Mar. 15, 2018

(30) Foreign Application Priority Data

Sep. 15, 2016 (IN) .............................. 201641031452

(51) Int. Cl.
*G06N 7/00* (2006.01)
*G06F 11/07* (2006.01)
*G06F 40/30* (2020.01)

(52) U.S. Cl.
CPC ......... *G06N 7/005* (2013.01); *G06F 11/0709* (2013.01); *G06F 11/0757* (2013.01); *G06F 11/0778* (2013.01); *G06F 40/30* (2020.01)

(58) Field of Classification Search
USPC ........................................................ 706/52
See application file for complete search history.

(56) References Cited

U.S. PATENT DOCUMENTS

| | | | |
|---|---|---|---|
| 10,409,914 B2 * | 9/2019 | Misra ............. | G06Q 10/063112 |
| 10,534,861 B2 * | 1/2020 | Dwarakanath ............ | G06F 8/74 |
| 10,545,856 B2 * | 1/2020 | Singi ................... | G06F 11/3684 |
| 10,565,520 B2 * | 2/2020 | Misra ....................... | G06F 16/23 |
| 10,592,397 B2 * | 3/2020 | Sharma ..................... | G06F 8/75 |
| 10,592,398 B1 * | 3/2020 | Dwarakanath ...... | G06F 11/3672 |
| 10,606,450 B2 * | 3/2020 | Sharma ................. | G06F 3/0482 |
| 10,642,913 B2 * | 5/2020 | Sharma ............... | G06F 16/9535 |
| 10,643,102 B2 * | 5/2020 | Narayanaswamy Chandrasekaran ......... | H04L 41/5074 |

(Continued)

*Primary Examiner* — Michael B Holmes
(74) *Attorney, Agent, or Firm* — Harrity & Harrity, LLP

(57) ABSTRACT

A device may receive a first sample. The device may identify a plurality of second samples that are similar to the first sample. The plurality of second samples may correspond to service tickets that have previously been processed. The device may obtain or determine log information identifying a plurality of events associated with the first sample. The device may determine respective probabilities of occurrence corresponding to the plurality of second samples. A probability of occurrence, for a particular second sample, may identify a likelihood of receiving a corresponding service ticket within a particular time period of occurrence of the plurality of events. The device may assign ranks to the plurality of second samples based on the respective probabilities of occurrence. The device may provide information identifying the ranks and the plurality of second samples.

20 Claims, 10 Drawing Sheets

(56) References Cited

U.S. PATENT DOCUMENTS

| | | | |
|---|---|---|---|
| 10,705,795 B2* | 7/2020 | Podder | G06Q 10/06 |
| 10,762,161 B2* | 9/2020 | Rao | G06F 16/9577 |
| 10,768,893 B2* | 9/2020 | Misra | G06N 5/022 |
| 10,824,870 B2* | 11/2020 | Misra | G06N 3/006 |
| 10,832,187 B2* | 11/2020 | Sharma | G06Q 10/063112 |
| 2018/0060307 A1* | 3/2018 | Misra | G06F 40/30 |
| 2020/0160666 A1* | 5/2020 | Lutnick | G07F 17/3293 |

\* cited by examiner

AUTOMATED INFERENCE OF EVIDENCE FROM LOG INFORMATION

RELATED APPLICATION(S)

This application claims priority under 35 U.S.C. § 119 to Indian Patent Application No. 201641031452, filed on Sep. 15, 2016, the content of which is incorporated by reference herein in its entirety.

BACKGROUND

An application may be implemented on one or more devices. Users may interact with the application and/or the one or more devices. When a user encounters aberrant (e.g., anomalous, deviant, peculiar, abnormal, etc.) behavior of the application, the user, or a device associated with the user, may report the aberrant behavior to an application management entity so that the entity can log and/or resolve a cause of the aberrant behavior. For example, the user may generate a service ticket that includes a textual description of the aberrant behavior.

SUMMARY

A device may include one or more processors. The device may receive a first sample. The device may identify a plurality of second samples that are similar to the first sample. The plurality of second samples may correspond to service tickets that have previously been processed. The device may obtain or determine log information identifying a plurality of events associated with the first sample. The device may determine respective probabilities of occurrence corresponding to the plurality of second samples. A probability of occurrence, for a particular second sample, may identify a likelihood of receiving a corresponding service ticket within a particular time period of occurrence of the plurality of events. The device may assign ranks to the plurality of second samples based on the respective probabilities of occurrence. The device may provide information identifying the ranks and the plurality of second samples.

A method may include receiving, by a device, an input sample corresponding to an input service ticket. The method may include identifying, by the device, a plurality of output samples that are similar to the input sample. The plurality of output samples may be selected from historical service tickets that have previously been processed. The method may include obtaining or determining, by the device, log information identifying a plurality of events associated with the input sample. The method may include determining, by the device, respective probabilities of occurrence corresponding to the plurality of output samples. A probability of occurrence, for a particular output sample of the plurality of output samples, may identify a likelihood of receiving a corresponding service ticket within a particular time period of occurrence of the plurality of events. The method may include assigning, by the device, ranks to the plurality of output samples based on the respective probabilities of occurrence. The method may include providing, by the device, information identifying the ranks and the plurality of output samples.

A non-transitory computer-readable medium may store one or more instructions that, when executed by one or more processors, cause the one or more processors to receive a first sample. The one or more instructions, when executed by the one or more processors, may cause the one or more processors to identify a plurality of second samples that are similar to the first sample. The plurality of second samples may be selected from historical service tickets that have previously been processed. The one or more instructions, when executed by the one or more processors, may cause the one or more processors to identify a plurality of events associated with the first sample based on log information for a device associated with the plurality of events. The one or more instructions, when executed by the one or more processors, may cause the one or more processors to determine respective probabilities of occurrence corresponding to the plurality of second samples. A probability of occurrence, for a particular second sample, may identify a likelihood of receiving a corresponding service ticket within a particular time period of occurrence of the plurality of events. The one or more instructions, when executed by the one or more processors, may cause the one or more processors to assign ranks to the plurality of second samples based on the respective probabilities of occurrence. The one or more instructions, when executed by the one or more processors, may cause the one or more processors to provide information identifying the ranks and the plurality of second samples.

DETAILED DESCRIPTION

Figure 1A:
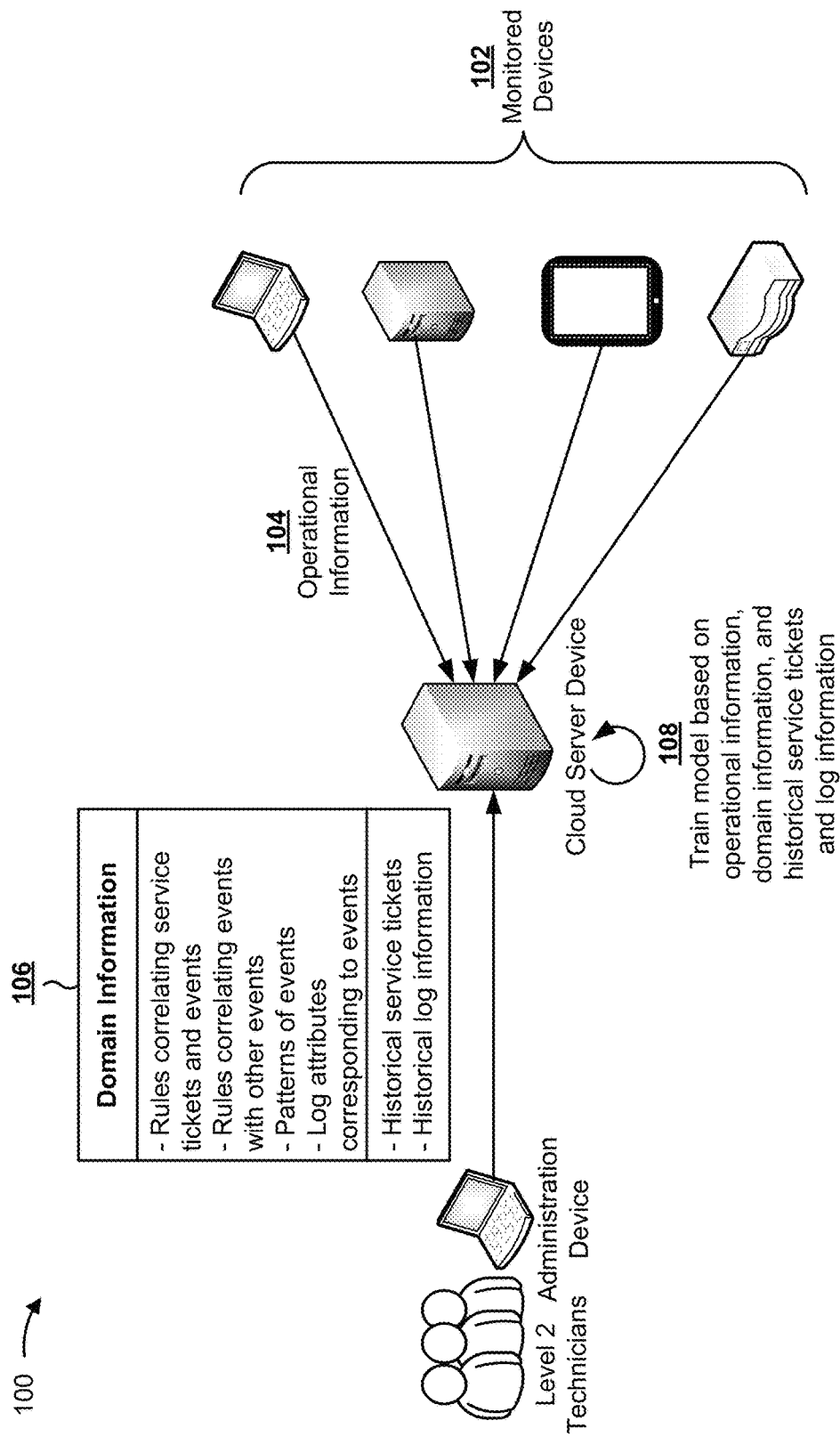
FIGS. 1A-1D are diagrams of an overview of an example implementation described herein.

The following detailed description of example implementations refers to the accompanying drawings. The same reference numbers in different drawings may identify the same or similar elements.

An application management entity may implement, deploy, and/or maintain an application. The application may be associated with or hosted by one or more monitored devices. For example, a monitored device may include a point of sale terminal, a user device, a computer associated with an office employee, or any other device.

When a user of a monitored device encounters aberrant behavior of the monitored device or the application, the user may generate a service ticket that describes the aberrant behavior. For example, the service ticket may include a textual description of the aberrant behavior, the monitored device, information associated with the user or a device associated with the user, and/or other information related to resolving the aberrant behavior. The user may provide the service ticket to the application management entity to facilitate resolution of the aberrant behavior. This service ticket may be referred to herein as an input ticket or an input sample.

It may be helpful, for a technician associated with the application management entity, to identify historical service tickets that are similar to the input ticket. For example, the technician may identify actions that were performed to resolve the historical service tickets, and may perform the identified actions to resolve the input ticket. It may also be helpful to identify clusters of service tickets that are similar to or temporally related to the input ticket. For example, the input ticket may be associated with a first event, in a series of events that have been previously observed or reported to the application management entity based on historical service tickets.

To identify similar service tickets, an analytics platform may perform natural language processing or a similar process to identify semantically similar service tickets. However, semantically similar service tickets may or may not be associated with similar underlying events as the input ticket. An underlying event is an event that occurs in association with a corresponding service ticket. For example, the underlying events associated with the input ticket may cause the aberrant behavior associated with the input ticket.

Implementations described herein identify output tickets that are selected from historical service tickets based on underlying events associated with the input ticket. In some cases, the output tickets may be referred to herein as output samples. Implementations described herein may automatically identify the underlying events based on log information (e.g., runtime logs) associated with the monitored devices. Implementations described herein may rank the output tickets based on the underlying events, and based on sets of events associated with the output tickets. For example, when an output ticket is associated with a set of historical events similar to the underlying events associated with the input ticket, the output ticket may be ranked higher than an output ticket that is associated with dissimilar events.

Implementations described herein may rank the output tickets based on a temporal relationship between the output tickets and the input ticket. For example, implementations described herein may identify, based on the underlying events and based on historical information, output tickets that are likely to be received within a particular time period after the input ticket or in association with the input ticket. Thus, implementations described herein may permit identification and ranking of output tickets based on sets of underlying events, which improves utilities of the output tickets for resolution of the input ticket.

In this way, performance of the monitored devices is improved and computational and organizational resources of the application management entity are conserved based on conservation of processing and storage resources. Further, by identifying the output tickets based on the temporal relationship, implementations described herein may permit prediction and proactive resolution of aberrant behavior based on an input ticket, which conserves computational resources (e.g., storage and processing resources) that would otherwise be used to reactively resolve the aberrant behavior.

FIGS. 1A-1D are diagrams of an overview of an example implementation 100 described herein. As shown by reference number 102, example implementation 100 may include a set of monitored devices. As shown by reference number 104, a cloud server device may receive operational information associated with the monitored devices. The operational information may identify the set of monitored devices, configuration information associated with the monitored devices, and/or instructions for obtaining log information associated with the set of monitored devices. The cloud server device may obtain log information relating to the monitored devices based on the operational information.

As shown by reference number 106, the cloud server device may receive, from an administration device, domain information. Domain information may include information that is to be used to identify correlations between log information, service tickets, and/or events corresponding to the log information and service tickets. For example, the domain information may be specific to a domain associated with the set of monitored devices. As a more particular example, when the set of monitored devices includes point-of-sale terminals, the domain information may identify patterns of events that have been previously observed with regard to point-of-sale terminals, and may identify service tickets, reported by terminal users, that have previously been associated with the patterns of events (e.g., a buffer overflow error event and a card read error event may be associated with a subsequent "card reader isn't working" service ticket). As further shown, the domain information may identify rules correlating service tickets and events, rules correlating events with other events, patterns of events, log attributes corresponding to events, and/or the like.

As further shown, the cloud server device may receive historical service tickets and historical log information corresponding to the historical service tickets. The historical service tickets may include service tickets that have been previously processed by the cloud server device or another device. The historical log information may include log information corresponding to the historical service tickets. For example, the historical log information for each historical service ticket may identify a set of events (e.g., underlying events) corresponding to each historical service ticket. The cloud server device may use this information to predict events associated with an input ticket, and/or to rank output tickets for relevance to an input ticket, as described in more detail below.

As shown, in some implementations, the domain information may be provided by, or may be based on information provided by, a user such as a technician (e.g., via the administration device). For the purpose of example implementation 100, Level 1 technicians and Level 2 technicians are described. Assume that a Level 2 technician is associated with a greater level of expertise than a Level 1 technician. For example, a Level 2 technician may be associated with subject matter expertise with regard to the domain associated with the set of monitored devices that a Level 1 technician does not possess. As another example, a Level 2 technician may have a higher level of certification than a Level 1 technician. Notably, while the administration device is described as being associated with a user, the administration device may perform implementations described herein without the assistance of a user. For example, the administration device may automatically determine domain information, may automatically select historical service tickets and historical log information to provide to the cloud server device, or the like.

As shown by reference number 108, the cloud server device may train a model based on the operational information, the domain information, the historical service tickets, and the historical log information. For example, the cloud server device may train the model based on a machine learning algorithm, a neural network process, an artificial intelligence process, or the like. The model may receive, as input, input log information associated with an input service ticket. Based on underlying events identified by the input log information, the model may output information identifying predicted events associated with the input ticket. The model may also output information identifying ranks to be assigned to a set of output tickets that are similar to the input ticket, as described in more detail below. Assume that the cloud server device stores the model.

Figure 1B:
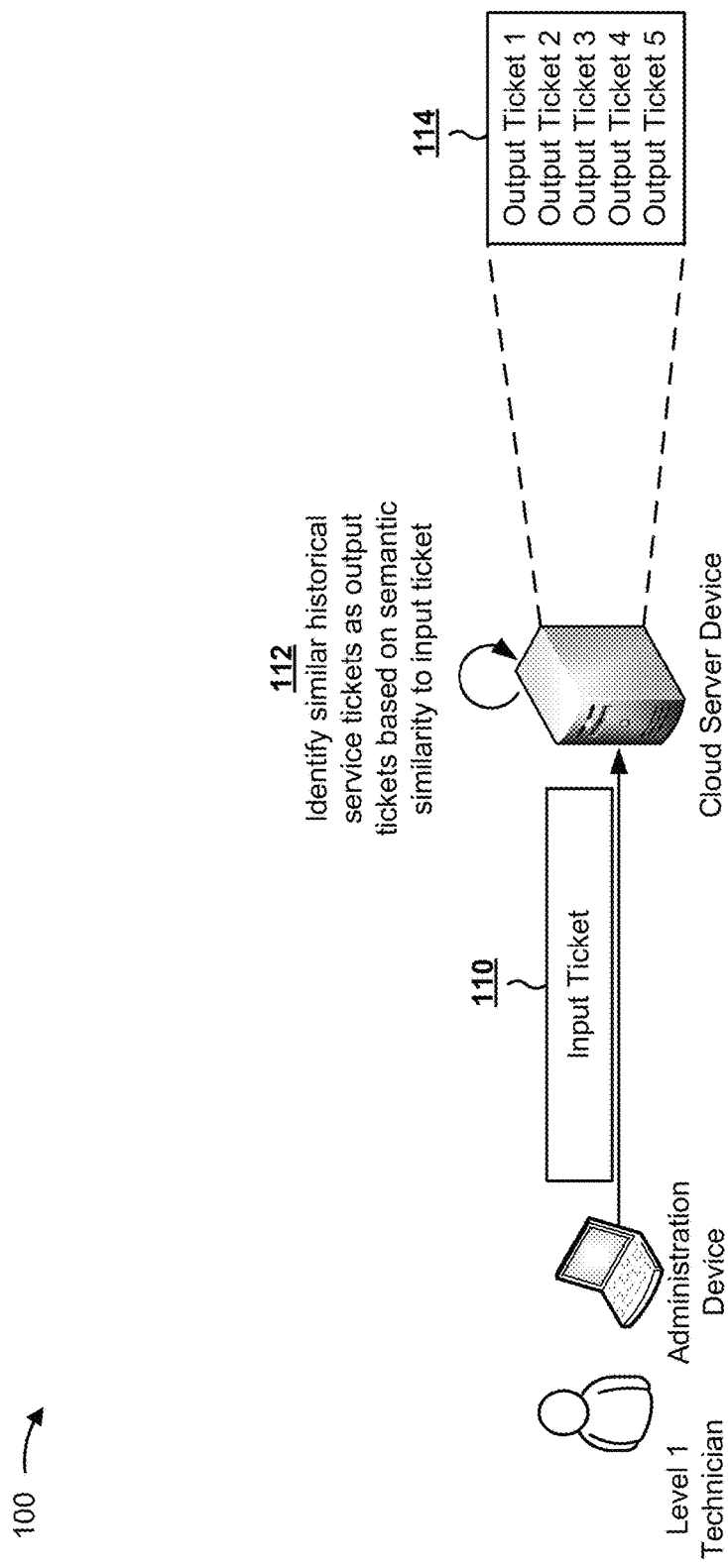

As shown in FIG. 1B, and by reference number 110, the cloud server device may receive an input ticket from the administration device. In some implementations, the cloud server device may receive the input ticket from another device, such as a monitored device, a user device associated with a user who generates the input ticket, or the like. The input ticket may include a description of an error, a fault, an aberrant behavior, or the like, associated with the set of monitored devices.

As shown by reference number 112, the cloud server device may identify service tickets, of the set of historical service tickets, which are semantically similar to the input ticket. The cloud server device may select the identified service tickets as output tickets. In some implementations, the cloud server device may select the output tickets based on keyword matching with the input ticket, based on a temporal relationship between the output tickets and the input ticket, or based on another criterion. As shown by reference number 114, the output tickets include Output Tickets 1 through 5.

Figure 1C:
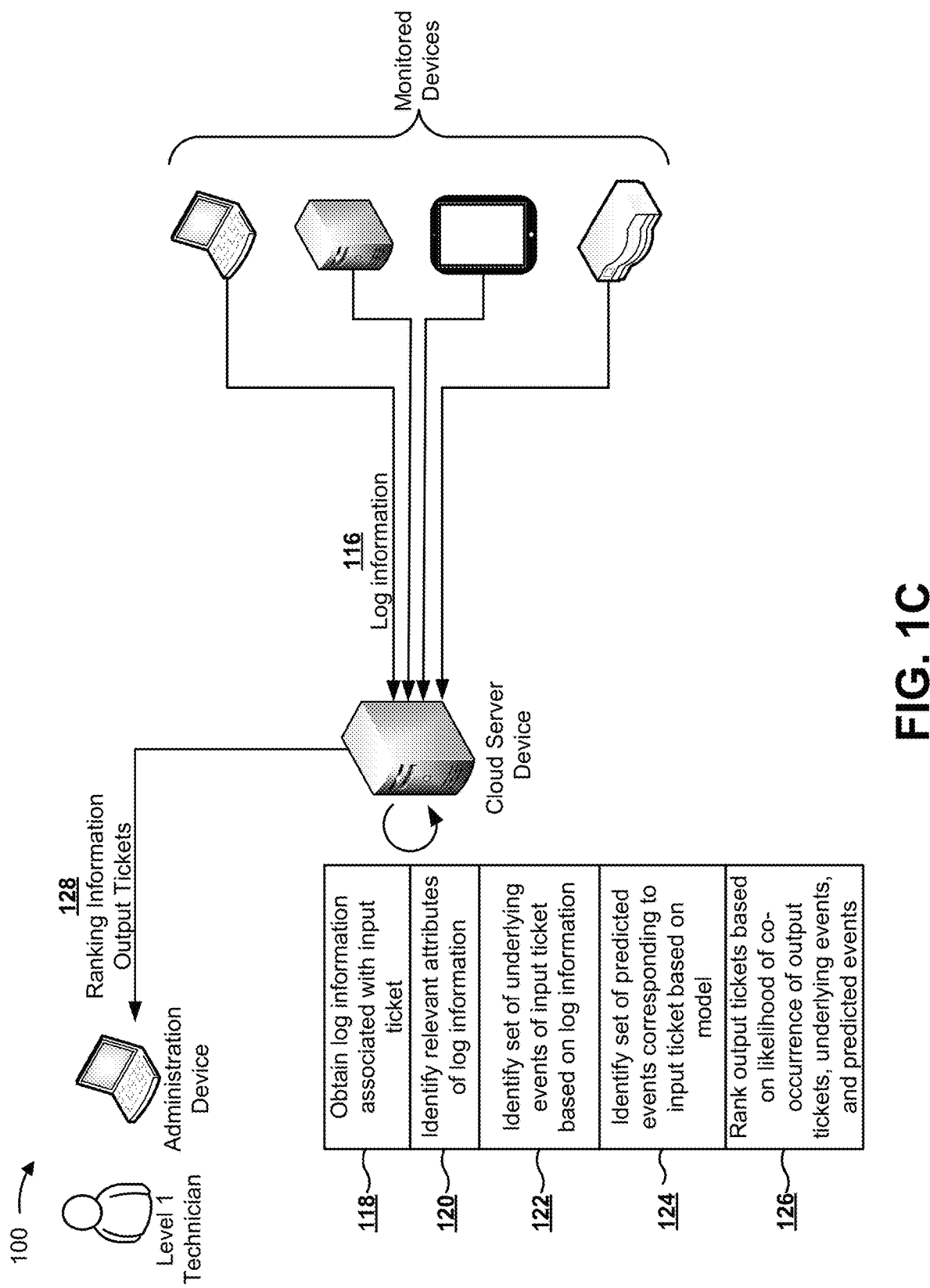

As shown by reference number 116 in FIG. 1C, the monitored devices may provide log information to the cloud server device. For example, the cloud server device may store log information corresponding to runtime logs of the monitored devices (e.g., in real time or substantially real time, etc.). As shown by reference number 118, the cloud server device may obtain log information that is associated with the input ticket. For example, the cloud server device may obtain log information from a particular time period before and/or after the input ticket was received or generated.

As shown by reference number 120, the cloud server device may identify relevant attributes of the log information associated with the input ticket. For example, the cloud server device may identify the relevant attributes based on the domain information identifying the relevant attributes. As shown by reference number 122, the cloud server device may identify a set of underlying events associated with the input ticket based on the relevant attributes. An underlying event is an event, associated with an input ticket, which has occurred.

As shown by reference number 124, the cloud server device may identify a set of predicted events corresponding to the input ticket based on the model (i.e., the model described in connection with FIG. 1A). To identify the set of predicted events, the cloud server device may identify the set of underlying events based on the log information, and may identify one or more events that are statistically likely to co-occur with the set of underlying events in a particular time period. The set of predicted events may be identified based on historical events. For example, the cloud server device may identify historical events corresponding to the underlying events, and may identify other historical events, as predicted events, that occurred in association with the historical events corresponding to the underlying events. The particular time period may be determined based on the model, or may be specified (e.g., based on the domain information, based on user input, etc.).

As shown by reference number 126, the cloud server device may rank the output tickets based on likelihood of co-occurrence of the output tickets, the underlying events, and the predicted events. For example, the cloud server device may input, to the model, information identifying the output tickets, the underlying events, and the predicted events. The model may output information that identifies respective probabilities of occurrence of the output tickets in association with the underlying events and the predicted events. The cloud server device may rank the output tickets based on the respective probabilities of occurrence. For example, the cloud server device may assign a highest rank to an output ticket associated with a greatest probability of co-occurrence, may assign a second-highest rank to an output ticket associated with a second-greatest probability of occurrence, and so on.

As shown by reference number 128, the cloud server device may provide ranking information that identifies the ranks for the output tickets, and may provide information identifying the output tickets, to the administration device. In some implementations, the cloud server device may provide information associated with the output tickets, such as information identifying actions that were performed to resolve the output tickets, information identifying monitored devices associated with the underlying events and/or predicted events, information identifying users that resolved the output tickets, or the like.

In this way, the cloud server device provides a list of output tickets that are ranked based on events associated with the output tickets and the input ticket. Thus, the cloud server device improves efficiency of resolution of the input ticket and reduces amounts of downtime and errors associated with the set of monitored devices. Also, by using domain information provided by Level 2 technicians to identify underlying events, predicted events, and output tickets, the cloud server device utilizes expertise of the Level 2 technicians to improve effectiveness of Level 1 technicians. This conserves organizational resources and reduces downtime and outages associated with the set of monitored devices, which saves time and money. Further, the cloud server device predicts events and/or tickets based on the underlying events, which permits preventative actions to be taken with regard to the predicted events and/or tickets.

Figure 1D:
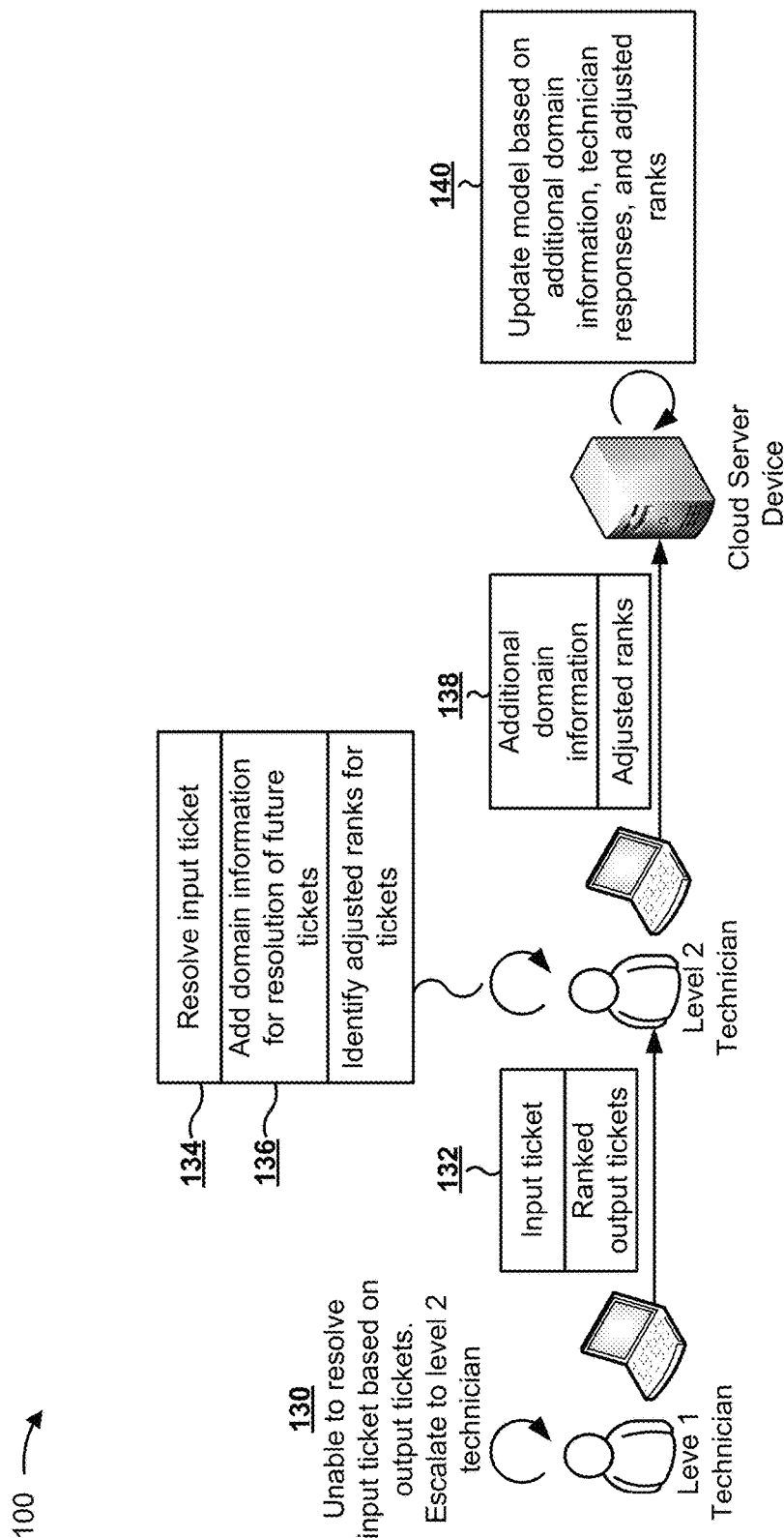

As shown in FIG. 1D, and by reference number 130, in some cases, a user (e.g., a Level 1 technician) may be unable to resolve the input ticket based on the output tickets. As shown by reference number 132, the administrative device associated with the Level 1 technician may provide the input ticket, the output tickets, and the ranking information to an administrative device associated with a Level 2 technician. In other words, the administrative device associated with the Level 1 technician may escalate the input ticket to the administrative device associated with the Level 2 technician.

As shown by reference number 134, the administrative device associated with the Level 2 technician may resolve the input ticket. For example, the Level 2 technician may have expertise in the domain associated with the monitored devices that the Level 1 technician lacks, and may use this expertise to resolve the issue associated with the input ticket. As another example, the administrative device associated with the Level 2 technician may be associated with permissions to reconfigure the monitored devices, and the administrative device associated with the Level 1 technician may not have such permissions.

As shown by reference number 136, the administrative device associated with the Level 2 technician may add additional domain information for resolution of future tickets. For example, the additional domain information may include information identifying additional events, other than the underlying events and the predicted events, that were relevant to resolution of the input ticket; information identifying attributes of log information that may be used to identify the additional events; information identifying adjusted probabilities of co-occurrence of tickets and/or events; information identifying particular events to be associated with an output ticket or a historical service ticket; and/or other information relevant to the resolution of the input ticket. In some implementations, the additional domain information may be determined automatically. For example, the cloud server device may identify actions performed to resolve the input ticket, and may determine additional domain information identifying the actions. As another example, the cloud server device may determine whether the predicted events actually occurred, and may determine additional domain information based on whether the predicted events actually occurred. As further shown, the administrative device associated with the Level 2 technician may identify adjusted rankings for the output tickets (e.g., automatically, based on user input of the Level 2 technician, etc.).

As shown by reference number 138, the administrative device associated with the Level 2 technician may provide the additional domain information and information identifying the adjusted ranks to the cloud server device. As shown by reference number 140, the cloud server device may update the model based on the additional domain information, technician responses received from the Level 1 technician and/or the Level 2 technician, and/or the adjusted ranks. For example, the cloud server device may adjust probabilities of co-occurrence associated with events and/or service tickets, may adjust parameters for identifying underlying events and/or predicted events, may adjust parameters for determining probabilities of co-occurrence of output tickets, or the like.

In this way, a cloud server device may rank output tickets based on sets of underlying events and/or predicted events associated with an input ticket, which improves remediation of issues associated with the input ticket and reduces computing resource consumption based on errors or misconfiguration with regard to monitored devices. Further, by ranking output tickets based on likelihood of occurrence with regard to the underlying events and/or predicted events, the cloud server device enables preemptive remediation of events associated with the output tickets, which improves functionality of monitored devices and conserves computational and organizational resources that would otherwise be used to address the output tickets as they are generated.

As indicated above, FIGS. 1A-1D is provided merely as an example. Other examples are possible and may differ from what was described with regard to FIGS. 1A-1D.

Figure 2:
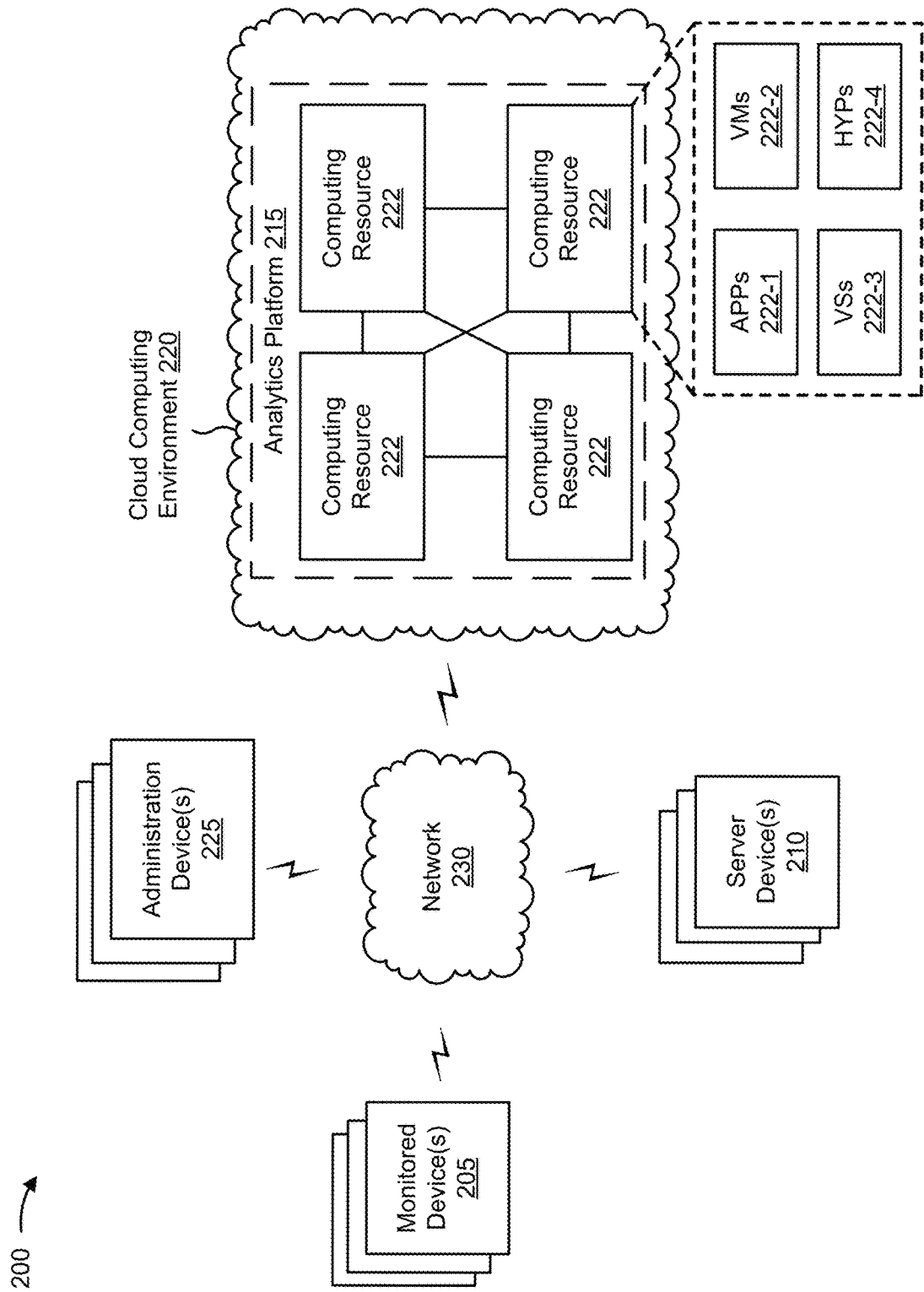
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more monitored devices 205, one or more server devices 210, an analytics platform 215 hosted within a cloud computing environment 220, one or more administration devices 225, and a network 230. Devices of environment 200 may interconnect via wired connections, wireless connections, or a combination of wired and wireless connections.

Monitored device 205 includes one or more devices or components capable of generating log information (e.g., a run-time log) to be monitored by analytics platform 215 and/or administration device 225. For example, monitored device 205 may include a communication and computing device, such as a mobile phone (e.g., a smart phone, a radiotelephone, etc.), a laptop computer, a desktop computer, a tablet computer, a handheld computer, a wearable communication device (e.g., a smart wristwatch, a pair of smart eyeglasses, etc.), a point-of-sale device, a card reader, an automated teller machine (ATM), or a similar type of device. In some implementations, monitored device 205 may include one or more applications or one or more components of an application. For example, an application may be hosted on or executed on monitored device 205.

Server device 210 includes one or more devices capable of receiving, collecting, obtaining, gathering, storing, processing, and/or providing information, such as ticket information or log information associated with one or more monitored devices 205. For example, server device 210 may include a server or a group of servers. In some implementations, server device 210 may include a device that stores or has access to log information and/or information identifying past service tickets that is to be used by analytics platform 215 to rank input tickets.

Analytics platform 215 includes one or more devices capable of receiving, determining, processing, storing, and/or providing information associated with monitored devices 205, such as log information, ticket information, or the like. For example, analytics platform 215 may include a server or a group of servers. In some implementations, analytics platform 215 may generate, train, update, store, and/or provide a model for identifying sets of events associated with service tickets, and/or for assigning ranks to service tickets based on the sets of events.

In some implementations, as shown, analytics platform 215 may be hosted in cloud computing environment 220. Notably, while implementations described herein describe analytics platform 215 as being hosted in cloud computing environment 220, in some implementations, analytics platform 215 may not be cloud-based or may be partially cloud-based.

Cloud computing environment 220 includes an environment that hosts analytics platform 215. Cloud computing environment 220 may provide computation, software, data access, storage, etc. services that do not require end-user (e.g., monitored device 205) knowledge of a physical location and configuration of system(s) and/or device(s) that hosts analytics platform 215. As shown, cloud computing environment 220 includes a group of computing resources 222 (referred to collectively as "computing resources 222" and individually as "computing resource 222").

Computing resource 222 includes one or more personal computers, workstation computers, server devices, or another type of computation and/or communication device. In some implementations, computing resource 222 may host analytics platform 215. The cloud resources may include compute instances executing in computing resource 222, storage devices provided in computing resource 122, data transfer devices provided by computing resource 222, etc. In some implementations, computing resource 222 may communicate with other computing resources 222 via wired connections, wireless connections, or a combination of wired and wireless connections.

As further shown in FIG. 2, computing resource 222 may include a group of cloud resources, such as one or more applications ("APPs") 222-1, one or more virtual machines ("VMs") 222-2, one or more virtualized storages ("VSs") 222-3, one or more hypervisors ("HYPs") 222-4, or the like.

Application 222-1 includes one or more software applications that may be provided to or accessed by monitored device 205. Application 222-1 may eliminate a need to install and execute the software applications on monitored device 205. For example, application 222-1 may include software associated with analytics platform 215 and/or any other software capable of being provided via cloud computing environment 220. In some implementations, one application 222-1 may send/receive information to/from one or more other applications 222-1, via virtual machine 222-2.

Virtual machine 222-2 includes a software implementation of a machine (e.g., a computer) that executes programs like a physical machine. Virtual machine 222-2 may be either a system virtual machine or a process virtual machine, depending upon use and degree of correspondence to any real machine by virtual machine 222-2. A system virtual machine may provide a complete system platform that supports execution of a complete operating system ("OS"). A process virtual machine may execute a single program, and may support a single process. In some implementations, virtual machine 222-2 may execute on behalf of a user (e.g., monitored device 205), and may manage infrastructure of cloud computing environment 220, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 222-4 provides hardware virtualization techniques that allow multiple operating systems (e.g., "guest operating systems") to execute concurrently on a host computer, such as computing resource 222. Hypervisor 222-4 may present a virtual operating platform to the guest operating systems, and may manage the execution of the guest operating systems. Multiple instances of a variety of operating systems may share virtualized hardware resources.

Administration device 225 includes one or more devices that are capable of receiving, storing, generating, processing, and/or providing information associated with service tickets and/or events. For example, monitored device 205 may include a communication and computing device, such as a mobile phone (e.g., a smart phone, a radiotelephone, etc.), a laptop computer, a desktop computer, a tablet computer, a handheld computer, a wearable communication device (e.g., a smart wristwatch, a pair of smart eyeglasses, etc.), or a similar type of device.

Network 230 includes one or more wired and/or wireless networks. For example, network 230 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
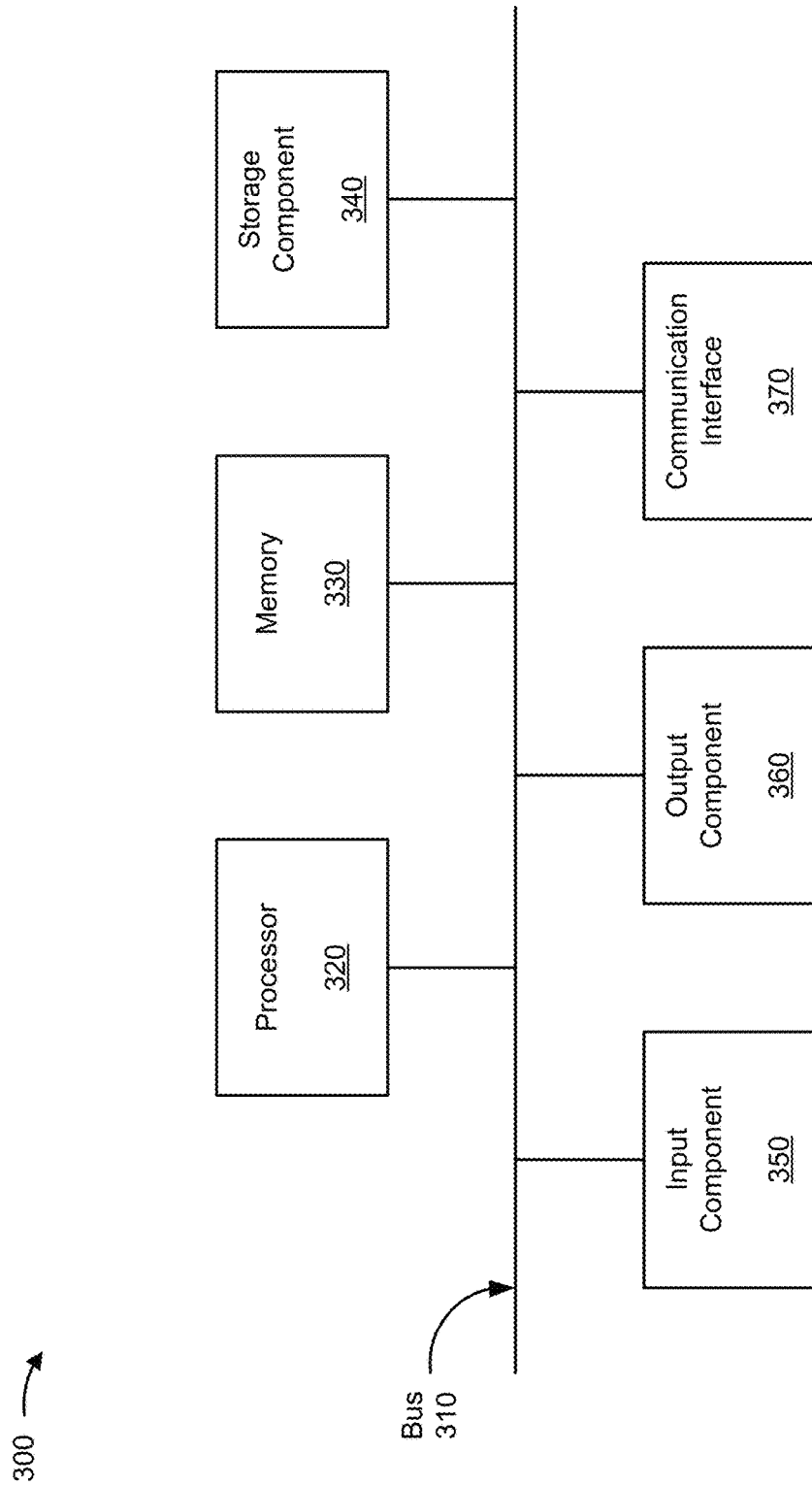
FIG. 3 is a diagram of example components of one or more devices of FIG. 2.

FIG. 3 is a diagram of example components of a device 300. Device 300 may correspond to monitored device 205, server device 210, analytics platform 215, computing resource 222, and/or administration device 225. In some implementations, monitored device 205, server device 210, analytics platform 215, computing resource 222, and/or administration device 225 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
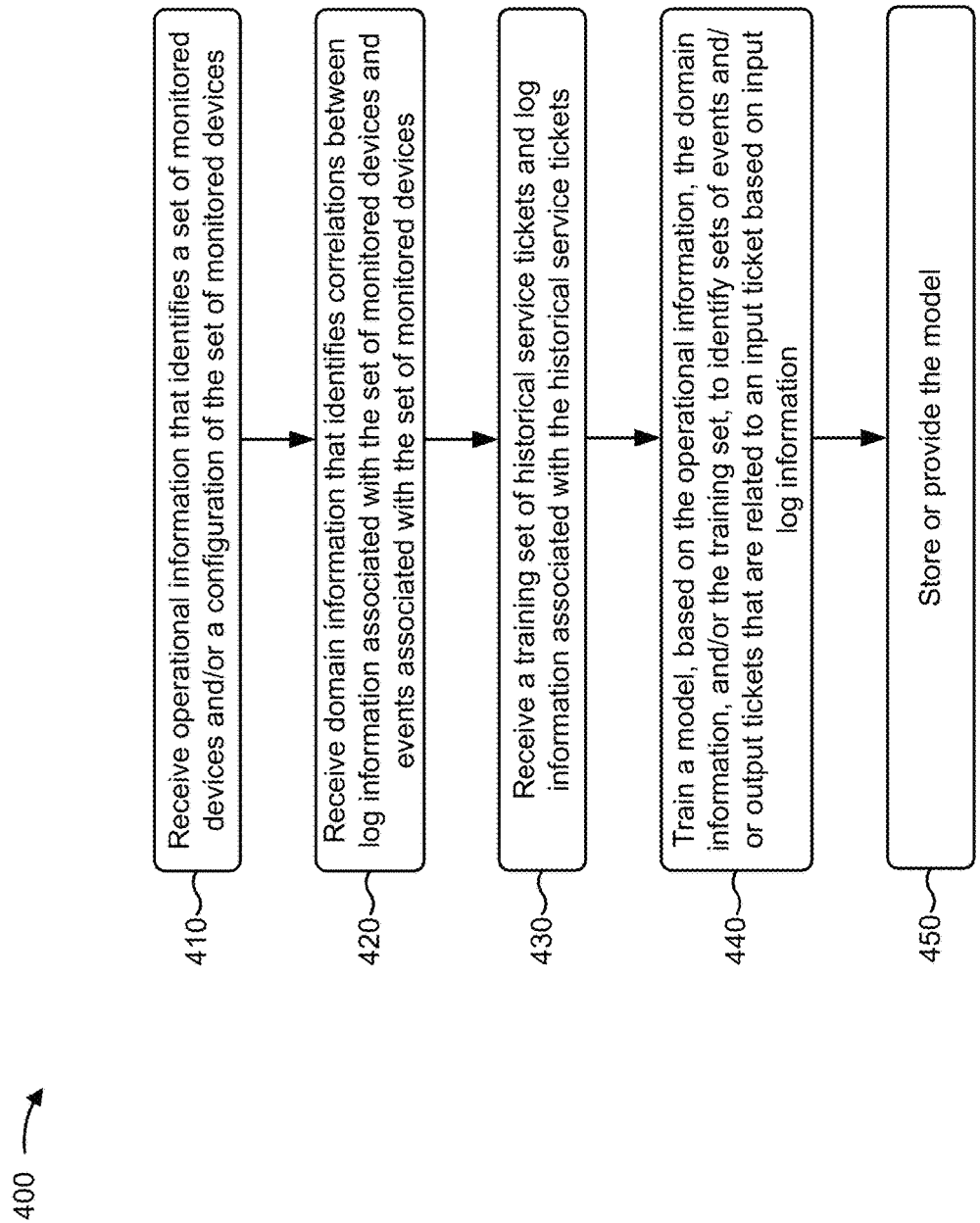
FIG. 4 is a flow chart of an example process for training a model to rank output tickets based on similarity of event sets, associated with the output tickets, to an input ticket.

FIG. 4 is a flow chart of an example process 400 for training a model to rank output tickets based on similarity of event sets associated with the output tickets to an input ticket. In some implementations, one or more process blocks of FIG. 4 may be performed by analytics platform 215. In some implementations, one or more process blocks of FIG. 4 may be performed by another device or a group of devices separate from or including analytics platform 215, such as monitored device 205, server device 210, and/or administration device 225.

As shown in FIG. 4, process 400 may include receiving operational information that identifies a set of monitored devices and/or a configuration of the set of monitored devices (block 410). For example, analytics platform 215 may receive operational information. The operational information may identify a set of monitored devices 205 and/or a configuration of the set of monitored devices 205. In some implementations, analytics platform 215 may receive the operational information from one or more of the set of monitored devices 205. For example, monitored device 205 may provide operational information to analytics platform 215 based on establishing a connection with analytics platform 215, based on receiving a request for operational information from analytics platform 215, or the like. Additionally, or alternatively, analytics platform 215 may receive the operational information based on user input. For example, analytics platform 215 may receive operational information from administration device 225 based on a user input to administration device 225 to specify the operational information.

In some implementations, the operational information may include information identifying a set of monitored devices 205. For example, the operational information may identify device identifiers associated with the set of monitored devices 205, device types associated with the set of monitored devices 205, or the like. Additionally, or alternatively, the operational information may relate to an architecture associated with one or more monitored devices 205. For example, the operational information may identify an application architecture associated with an application that is hosted by monitored device 205.

In some implementations, the operational information may include information that identifies a configuration of the set of monitored devices 205. For example, the operational information may identify a network address associated with monitored device 205 (e.g., an Internet Protocol (IP) address, a media access control (MAC) address, etc.), a communication protocol associated with monitored device 205, one or more applications hosted by monitored device 205, or the like. As another example, the operational information may identify instructions for communicating with monitored device 205 to obtain or receive log information (e.g., credentials, ports, a schedule for obtaining or receiving log information, particular log information to obtain, etc.)

In some implementations, the operational information may identify a format for log information generated by monitored device 205. For example, monitored device 205 may generate log information based on operation of monitored device 205. The log information may identify runtime events or other events associated with operation of monitored device 205 (e.g., anomalous events, warnings, resource availability, errors, debugging information, etc.). Different monitored devices 205 may be associated with differently formatted log information. In such cases, the log information may be referred to as partially ordered log information. The operational information may identify formatting of log information to be provided or generated by monitored device 205, which permits analytics platform 215 to identify sets of events in the log information corresponding to service tickets.

As further shown in FIG. 4, process 400 may include receiving domain information that identifies correlations between log information associated with the set of monitored devices and events associated with the set of monitored devices (block 420). For example, analytics platform 215 may receive domain information. The domain information may include information that is to be used to identify correlations between log information, service tickets, and/or events corresponding to the log information and service tickets. In some implementations, analytics platform 215 may receive the domain information from administration device 225. For example, administration device 225 may receive the domain information (e.g., based on a user input), and may provide the domain information to analytics platform 215.

In some implementations, the domain information may be specified or generated by a technician with subject matter expertise in a particular domain. For example, the technician may have previously experienced service incidents or events in the particular domain, and may have experience related to identifying events that are related to particular tickets. The technician may provide domain information based on this experience to permit training of a model to identify events and/or output tickets that are related to input tickets. In this way, a model may be trained based on domain-based knowledge, which reduces time and organizational resources required to identify related events or tickets. Furthermore, the model may permit quantification of a relationship between an input ticket and an output ticket (e.g., based on a temporal or statistical relationship between the input ticket and the output ticket), which permits further improvement of accuracy of the model and auditing of the results outputted by the model.

In some implementations, the domain information may identify a rule for correlating one or more tickets and one or more events. For example, the domain information may indicate that a "card read error" ticket for a point-of-sale device is typically associated with a subsequent "authentication error" ticket for a local server device associated with the point-of-sale device. As another example, the domain information may indicate that a set of events are likely to be observed in log information when an input ticket includes particular keywords. As yet another example, the domain information may indicate that an input ticket that includes particular keywords has historically been preceded by a particular underlying event that is identified by log information.

In some implementations, the domain information may identify a time period associated with a set of events and/or tickets. For example, assume that a particular input ticket is historically associated with a particular set of events that occur within one day of receipt of the particular input ticket. In that case, the domain information may identify a time period of one day, and may indicate to obtain log information for a period of one day preceding and following a time associated with the particular ticket. In this way, the domain information permits identification of related events and/or output tickets based on a temporal relation to an input ticket, which improves accuracy of identification of the related events and/or output tickets.

In some implementations, the domain information may identify a probability associated with a relationship between an event and a ticket, between two or more events, and/or between two or more tickets. For example, assume that a first ticket has been received ten times. Assume further that a second ticket has been received within one day of the first ticket on three occasions, assume that a first event has been observed within one day of the first ticket on five occasions, and assume that a second event has been observed within one day of the first ticket on seven occasions. In such a case, the domain information may identify probabilities of co-occurrence, in the time period of one day, of the first ticket and the second ticket (e.g., 30 percent), the first ticket and the first event (e.g., 50 percent), the first ticket and the second event (e.g., 70 percent), or a probability associated with co-occurrence of any other combination of two or more of the first ticket, the second ticket, the first event, and the second event. In this way, analytics platform 215 enables identification and/or ranking of related events and tickets based on probabilistic and temporal relationships, which further improves accuracy of the assigned ranks and/or identified events and tickets.

As further shown in FIG. 4, process 400 may include receiving a training set of historical service tickets and log information associated with the historical service tickets (block 430). For example, analytics platform 215 may receive a training set of historical service tickets and log information corresponding to the historical service tickets. In some implementations, analytics platform 215 may receive the training set from administration device 225. For example, administration device 225 may provide a set of historical service tickets and a set of log information associated with the set of historical service tickets. In some implementations, analytics platform 215 may receive the training set from multiple, different devices. For example, analytics platform 215 may receive historical service tickets from a user device, from analytics platform 215, or from another device. In such a case, analytics platform 215 may obtain log information that is related to the historical service tickets from server device 210 that stores log information, from monitored devices 205 associated with the historical service tickets, or the like.

In some implementations, the historical service tickets may be associated with the log information based on a temporal relationship between the historical service tickets and the log information, and/or based on a particular monitored device 205 being associated with the historical service tickets. For example, the log information may include information relating to or generated by a particular monitored device 205 that is identified by the historical service tickets. As another example, the log information may include information that is gathered in a particular time period before and/or after a historical service ticket is received. As yet another example, the log information may include information relating to or generated by a set of monitored devices 205 that are associated with a device to which a historical service ticket pertains.

The log information may include information relating to underlying events that are associated with service tickets and/or related events. For example, an underlying event (e.g., an error, a service outage, an overflow, etc.) may lead to aberrant behavior of monitored device 205, and a user may enter a service ticket based on the aberrant behavior. Additionally, or alternatively, monitored device 205 may automatically detect aberrant behavior and may generate a service ticket accordingly. In some cases, the underlying event may cause, be caused by, or be associated with related events and/or service tickets. For example, the particular event may be associated with related events and/or related service tickets that are observed within a particular time period of occurrence. Based on the log information, the domain information, and/or the operational information, analytics platform 215 may train a model to identify the underlying events, the related events, and the related service tickets, as described in more detail below.

In some implementations, analytics platform 215 may obtain the log information based on the operational information. For example, the operational information may identify formatting of log information, a particular device that stores log information, a date range of log information to obtain, or the like. Analytics platform 215 may obtain the log information from the particular device for the identified date range based on the formatting identified by the operational information.

As further shown in FIG. 4, process 400 may include training a model, based on the operational information, the domain information, and/or the training set, to identify sets of events and/or output tickets that are related to an input ticket based on input log information (block 440). For example, analytics platform 215 may train a model based on the operational information, the domain information, and/or the training set. The model may receive, as input, an input ticket and log information relating to the input ticket. Based on the training set of historical service tickets and log information, and/or based on another set of service tickets and corresponding log information, the model may output information identifying a set of events associated with the input ticket. Additionally, or alternatively, the model may output information identifying probabilities of occurrence of other events and/or reception of other service tickets based on the input ticket being received.

The model may be used to assign ranks to output tickets based on a likelihood that the output tickets are related to an input ticket. For example, analytics platform 215 may assign ranks to the output tickets based on similarities between sets of events associated with the input ticket and the output tickets and/or based on a likelihood of co-occurrence of the output tickets and the input ticket, as described in more detail in connection with FIG. 5, below.

In some implementations, analytics platform 215 may train the model based on an artificial intelligence approach, such as a machine learning algorithm, a neural network algorithm, or another type of artificial intelligence approach. To train the model based on the artificial intelligence approach, analytics platform 215 may use a training set of known inputs and known outputs corresponding to the inputs. The artificial intelligence approach may identify relationships between the known inputs and the known outputs, and may configure parameters corresponding to the relationships.

In some implementations, analytics platform 215 may update the model based on the artificial intelligence approach. For example, analytics platform 215 may use a later training set of known inputs and target outputs corresponding to the known inputs. The target outputs may be outputs that are known to be correct or that are associated with positive feedback (e.g., indicating that the target output is correctly associated with the corresponding known input). Analytics platform 215 may input, to the model, the known inputs of the later training set, and the model may output observed outputs. Analytics platform 215 may compare the target outputs to the observed outputs, and may reconfigure the parameters of the model based on the artificial intelligence algorithm. In this way, analytics platform 215 improves accuracy of the model based on iteratively improving accuracy of parameters of the model.

In some implementations, the model may identify underlying events associated with a service ticket based on the service ticket, log information corresponding to the service ticket, and domain information. For example, the domain information may include rules for identifying events based on attributes of log information and/or attributes of service tickets. In such a case, analytics platform 215 may train a model based on the domain information and based on a training set of service tickets, log information, and events identified by the log information and corresponding to the service tickets. The model may receive, as input, a service ticket and log information corresponding to the service ticket. The model may output information identifying one or more events associated with the service ticket based on the log information.

In some implementations, the model may identify predicted events associated with a service ticket based on the service ticket, log information associated with the service ticket, and historical service tickets and events corresponding to the historical service tickets. For example, the model may receive, as input, an input ticket and log information associated with the input ticket. The model may identify a set of underlying events corresponding to the input ticket based on the log information, and may identify one or more events that are statistically likely to co-occur with the set of underlying events in a particular time period. Analytics platform 215 may select the one or more events as predicted events based on a threshold (e.g., a threshold length of time, a threshold statistical probability of co-occurrence of the one or more events and the set of underlying events, etc.). Based on the predicted events, analytics platform 215 may assign rankings to output tickets, as described in more detail below.

In some implementations, the model may identify a predicted ticket associated with an input ticket based on the input ticket, log information associated with the input ticket, and historical service tickets and events corresponding to the historical service tickets. A predicted ticket is a ticket that is associated with a threshold probability of occurring within a particular time period of an input ticket. For example, analytics platform 215 may provide, to the model as input, an input ticket and input log information associated with the input ticket. The model may identify underlying events and/or predicted events associated with the input ticket, as described above. The model may use information that identifies historical service tickets and events corresponding to the historical service tickets to identify a predicted ticket corresponding to the input ticket. For example, the model may identify a set of historical events that is similar to the underlying events and/or predicted events, may identify a historical ticket that is associated with the set of historical events, and may provide the historical ticket as a predicted ticket. In some implementations, the model may determine a probability of occurrence of the predicted ticket.

In some implementations, analytics platform 215 may use the model to assign ranks to output tickets based on an input ticket, and based on respective sets of events corresponding to the input ticket and the output tickets. The output tickets may include historical tickets that have been identified as similar to the input tickets (e.g., based on semantic similarity, temporal similarity, user input, etc.). Analytics platform 215 may identify underlying events and/or predicted events associated with the input ticket, and may identify sets of historical events corresponding to the output tickets.

Based on the model, and based on the underlying events, the predicted events, and the sets of historical events, analytics platform 215 may determine probabilities of co-occurrence, in a particular time period, for the output tickets and the input ticket. A probability of co-occurrence may be determined based on a statistical and/or temporal relationship between an input ticket, an output ticket, and one or more events. For example, based on a likelihood of occurrence of the output ticket in association with a set of events that are associated with the input ticket, analytics platform 215 may determine the probability of co-occurrence. For a more detailed description of determination of similarity scores and/or rankings for output tickets based on the model, refer to block 550 of FIG. 5, below.

In some implementations, analytics platform 215 may generate a data structure to store information associated with the model. The information associated with the model may include, for example, information identifying statistical relationships between tickets and events, information identifying statistical relationships between pairs of events, or the like. For example, the data structure may include a graph data structure, such as a directed graph data structure. The graph data structure may include nodes corresponding to tickets or events, and may include edges between nodes. An edge between a pair of nodes (e.g., nodes corresponding to a pair of tickets, a pair of events, or a ticket and an event) may be associated with a value that identifies a probability of co-occurrence of the corresponding pair of nodes in a particular time period. In some implementations, each edge may be associated with a different pair of nodes. For a more detailed description of such a data structure, refer to FIGS. 6A and 6B, below.

For the purpose of FIG. 4, the model is described as being capable of identifying underlying events and predicted events associated with an input ticket, identifying historical events that are associated with the underlying events and predicted events, and ranking output tickets for similarity to the input ticket based on statistical and/or temporal relationships between the input ticket, the underlying events, the predicted events, and the historical events. In some implementations, analytics platform 215 may train two or more models to perform the above tasks. For example, analytics platform 215 may train a first model to identify underlying events based on log information, may train a second model to identify predicted events based on input tickets and/or underlying events, and so on.

As further shown in FIG. 4, process 400 may include storing or providing the model (block 450). For example, analytics platform 215 may store or provide the model to permit assignment of ranks to output tickets based on events associated with the output tickets and an input ticket. In some implementations, analytics platform 215 may provide or store a data structure in association with the model. For example, analytics platform 215 may provide or store a graph data structure that identifies statistical relationships between events and/or tickets. The graph data structure may permit assignment of ranks, by the model, to output tickets based on the statistical relationships.

In this way, analytics platform 215 generates a model and/or a data structure based on domain information and operational information associated with a set of monitored devices 205. By generating the model using domain information that identifies relationships between events and service tickets, analytics platform 215 conserves processor and organizational resources that would otherwise be used to identify the relationships based on trial and error, or the like. By training the model to assign ranks to output tickets based on underlying events and predicted events associated with input tickets, analytics platform 215 conserves processor resources and organizational resources that would otherwise be used to assess or improperly rank output tickets. Further, analytics platform 215 reduces downtime and errors associated with monitored devices 205.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
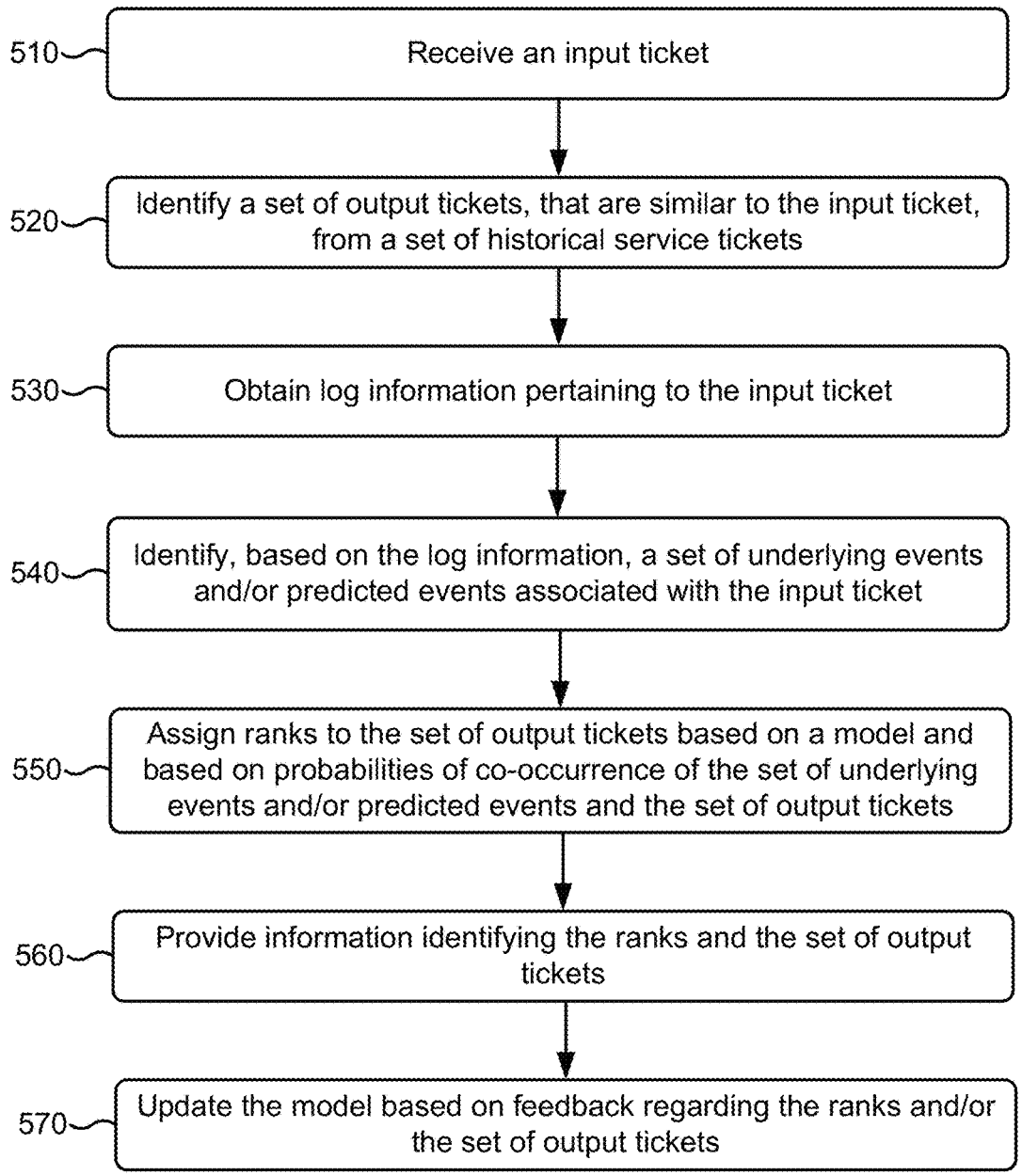
FIG. 5 is a flow chart of an example process for ranking output tickets for similarity to an input ticket based on event sets associated with the output tickets.

FIG. 5 is a flow chart of an example process 500 for ranking output tickets for similarity to an input ticket based on events associated with the input ticket. In some implementations, one or more process blocks of FIG. 5 may be performed by analytics platform 215. In some implementations, one or more process blocks of FIG. 5 may be performed by another device or a group of devices separate from or including analytics platform 215, such as monitored device 205, server device 210, and/or administration device 225.

As shown in FIG. 5, process 500 may include receiving an input ticket (block 510). For example, analytics platform 215 may receive an input sample of textual content. The input sample may correspond to a service ticket, such as an input ticket. Analytics platform 215 may receive the input ticket to identify output tickets that are similar to the input tickets, and to assign ranks to the output tickets based on relevance to the input ticket. In some implementations, the input ticket may be generated based on a user input regarding aberrant behavior of monitored device 205. For example, a user may observe aberrant behavior of monitored device 205, and may generate an input ticket that identifies monitored device 205 and describes the aberrant behavior (e.g., in natural language, based on a set of questions, etc.).

As further shown in FIG. 5, process 500 may include identifying a set of output tickets, which are similar to the input ticket, from a set of historical service tickets (block 520). For example, analytics platform 215 may identify a set of output tickets that are similar to the input ticket. The set of output tickets may include service tickets that are selected from a set of historical tickets. For example, the set of output tickets and/or the set of historical tickets may have previously been processed by analytics platform 215 and/or a technician. The sets of output tickets may be associated with a set of historical events that have been observed in association with one or more output tickets. For example, the set of historical events may be observed within a particular time period of a historical service ticket, may be repeatedly observed with regard to a particular type of historical service ticket, or the like.

Analytics platform 215 may identify the set of output tickets based on similarity of the set of output tickets to the input ticket. In some implementations, analytics platform 215 may identify the set of output tickets based on semantic similarity of the set of output tickets to the input tickets. For example, analytics platform 215 may identify semantic units of the input ticket and the set of output tickets based on a natural language processing algorithm, and may compare the semantic units to identify semantically similar output tickets. In some implementations, analytics platform 215 may identify the set of output tickets based on a time associated with the set of output tickets and the input tickets. For example, assume that a particular service ticket is received at a particular time each month (e.g., midnight on the first day of the month, etc.), and assume that an input ticket is received at the particular time. In this case, analytics platform 215 may identify output tickets that were received at the particular time in previous months. In some implementations, analytics platform 215 may identify the set of output tickets based on a particular monitored device 205 associated with the input ticket and the set of output tickets. In some implementations, analytics platform 215 may identify the set of output tickets in a manner other than those identified above.

In some implementations, an output ticket, of the set of output tickets, may be associated with a set of particular historical events and/or probabilities corresponding to the set of particular historical events. A probability associated with an output ticket and an event may identify a likelihood of co-occurrence of the output ticket and the event. For example, the probabilities may be identified by a data structure, such as the data structures described in FIGS. 6A and 6B. In some implementations, the data structure may be generated based on a model, based on domain information associated with the output ticket and the event, or the like. Additionally, or alternatively, the data structure may be generated based on the set of historical service tickets and corresponding historical events.

As further shown in FIG. 5, process 500 may include obtaining log information pertaining to the input ticket (block 530). For example, analytics platform 215 may obtain log information pertaining to the input ticket. In some implementations, analytics platform 215 may obtain the log information from monitored device 205. For example, analytics platform 215 may obtain the log information from a particular monitored device 205 that is identified by the input ticket, may obtain the log information from one or more other monitored devices 205 associated with the particular monitored device 205, or the like. Additionally, or alternatively, analytics platform 215 may obtain log information from server device 210. For example, server device 210 may store log information for monitored device 205, and may provide the log information to analytics platform 215. Thus, storage resources of monitored device 205 are conserved.

Additionally, or alternatively, analytics platform 215 may store the log information (e.g., as the log information is received from monitored device 205), and may obtain part of, or all of, the log information based on relevance of the log information to the input ticket. By storing log information, analytics platform 215 conserves storage resources of monitored device 205 and improves efficiency of obtaining the log information.

In some implementations, analytics platform 215 may obtain a subset of log information associated with monitored device 205. For example, analytics platform 215 may obtain log information associated with a particular time period (e.g., a particular time period before and/or after the input ticket was received). Thus, processor and storage resources of analytics platform 215 are conserved that would otherwise be used to obtain and process a larger quantity of log information. Additionally, or alternatively, analytics platform 215 may obtain log information based on operational information that identifies a manner in which the log information is to be obtained, as described in connection with FIG. 4, above.

As further shown in FIG. 5, process 500 may include identifying, based on the log information, a set of underlying events and/or predicted events associated with the input ticket (block 540). For example, analytics platform 215 may identify a set of underlying events and/or predicted events associated with the input ticket. Analytics platform 215 may identify the set of underlying events based on the log information, and may identify the set of predicted events based on the set of underlying events and based on information identifying historical events and/or tickets.

In some implementations, analytics platform 215 may identify the set of underlying events based on the log information. For example, analytics platform 215 may train a model to identify the set of underlying events based on the log information and based on domain information, as described in more detail in connection with FIG. 4, above. As another example, analytics platform 215 may identify the set of underlying events based on attributes of the log information associated with the input sample. The attributes and underlying events may be defined based on domain information received by analytics platform 215, as described in more detail in connection with FIG. 4, above. For example, a particular underlying event that precedes an input ticket may be identified by an attribute, such as a keyword, a string, a variable value or the like, in the log information. Analytics platform 215 may identify attributes of the log information corresponding to the set of underlying events to identify the set of underlying events.

In some implementations, analytics platform 215 may identify a set of predicted events associated with the input ticket and/or the set of underlying events. A predicted event may include an event that is predicted to occur within a particular time period of an input ticket. Analytics platform 215 may identify the set of predicted events based on the input ticket, the set of underlying events, and/or a model. For example, the model may be associated with a data structure that identifies probabilities associated with co-occurrence of ticket-event pairs and/or to event-event pairs. Analytics platform 215 may identify the set of predicted events based on the data structure. For example, analytics platform 215 may identify the set of underlying events in the data structure and may identify other events, of the data structure, that satisfy a probability threshold with regard to co-occurrence with the set of underlying events. As another example, analytics platform 215 may identify the predicted events based on identifying a particular ticket, of the data structure, that is most similar to the input tickets, and by identifying events that are associated with the particular ticket as predicted events.

As further shown in FIG. 5, process 500 may include assigning ranks to the set of output tickets based on a model and based on probabilities of co-occurrence of the set of underlying events and/or predicted events and the set of output tickets (block 550). For example, analytics platform 215 may assign ranks to the set of output tickets based on a model and based on a likelihood of co-occurrence of the events associated with the input ticket with each output ticket of the set of output tickets. The ranks may indicate relevance of the set of output tickets to the input ticket. For example, analytics platform 215 may assign a highest rank to an output ticket that analytics platform 215 predicts to be most likely to occur in association with a set of underlying events and/or predicted events of an input ticket. As another example, analytics platform 215 may assign a highest rank to an output ticket that analytics platform 215 predicts to be most likely to occur in association with a set of underlying events and/or predicted events of an input ticket.

As a more particular example, assume that an input event is associated with a particular set of events (e.g., predicted events and/or underlying events). Assume further that a first output ticket is associated with a first probability of occurrence based on the model, and assume that a second output ticket is associated with a second probability of occurrence based on the model. Assume that the second probability is lower than the first probability. For example, the first output ticket may be more likely than the second output ticket to occur when the particular set of events, associated with the input ticket, is identified by or predicted based on the log information. In such a case, analytics platform 215 may assign a higher rank to the first output ticket than the second output ticket. For a more detailed description of determination of probabilities of occurrence associated with the output tickets, refer to FIGS. 6A and 6B, below.

As further shown in FIG. 5, process 500 may include providing information identifying the ranks and the set of output tickets (block 560). For example, analytics platform 215 may provide information identifying the ranks and the set of output tickets. In some implementations, analytics platform 215 may provide the set of output tickets as a ranked list. For example, analytics platform 215 may provide the set of output tickets to administration device 225 to permit a technician associated with administration device 225 to resolve an issue associated with the input ticket. In some implementations, analytics platform 215 may provide information associated with the input ticket (e.g., information identifying the underlying events and/or predicted events, contextual information associated with the input ticket, etc.).

In some implementations, analytics platform 215 may provide information associated with the set of output tickets. For example, analytics platform 215 may provide information identifying the sets of related events associated with the output tickets. As another example, when one or more of the output tickets is a predicted output ticket (e.g., an output ticket that is predicted to be received in the future), analytics platform 215 may provide information that identifies a time at which the predicted output ticket is to be received. As yet another example, analytics platform 215 may provide information that identifies remedial actions that were performed to resolve the set of output tickets. As still another example, analytics platform 215 may provide information identifying one or more workers that were assigned to resolve the set of output tickets.

In some implementations, analytics platform 215 may reconfigure a device based on the output tickets and/or the ranks. For example, analytics platform 215 may cause one or more monitored devices 205 to be reconfigured to prevent events from occurring that are associated with the set of output tickets (e.g., events that caused aberrant behavior described by the set of output tickets). As another example, analytics platform 215 may cause one or more monitored devices 205 to be reconfigured to prevent predicted events, associated with the input ticket, from occurring. In this way, performance of monitored devices 205 is improved, and system resources that would otherwise be used to handle errors, exceptions, and/or the like, are conserved.

In some implementations, analytics platform 215 may provide information identifying the ranks and/or the set of output tickets to administration device 225, and administration device 225 may reconfigure monitored devices 205 based on the set of output tickets. For example, each output ticket may be associated with one or more actions to be performed to reconfigure monitored device 205. Analytics platform 215 may assign ranks to the set of output tickets based on the model, and may provide the ranked set of output tickets to administration device 225. Administration device 225 may perform actions associated with the ranked set of output tickets in a particular order based on the assigned ranks (e.g., may perform an action associated with a highest-ranked output ticket, then an action associated with a second-highest rank, and so on) until the input ticket is resolved. Additionally, or alternatively, analytics platform 215 may perform the actions associated with the ranked set of output tickets, and/or may cause the actions to be performed. In this way, analytics platform 215 causes automatic reconfiguration of monitored devices 205 based on the ranked set of tickets, which reduces a quantity of reconfiguration actions to be performed, thereby conserving time and computational resources and improving performance of monitored devices 205.

In some implementations, analytics platform 215 may assign the input ticket to a particular worker or technician based on the ranks and/or the set of output tickets. For example, analytics platform 215 may identify a worker that resolved one or more of the output tickets, and may assign the input ticket to be resolved by the worker. As another example, analytics platform 215 may determine that one or more of the output tickets is a predicted output ticket, and may assign a worker to preemptively resolve the predicted output ticket (e.g., to reconfigure a monitored device 205 so that one or more events associated with the predicted output ticket are prevented). In this way, analytics platform 215 improves efficiency of assignment of input tickets, which improves allocation of resources and reduces resource consumption associated with downtime or misconfiguration of monitored devices 205.

As further shown in FIG. 5, process 500 may include updating the model based on feedback regarding the ranks and/or the set of output tickets (block 570). For example, analytics platform 215 may receive feedback regarding the output tickets and/or the ranks assigned to the output tickets. The feedback may indicate whether the ranks assigned to the set of output tickets were accurate or helpful. In some implementations, analytics platform 215 may update the model based on an artificial intelligence process, such as a machine learning algorithm, a neural network algorithm, or the like, as described in more detail in connection with FIG. 4, above.

In some implementations, analytics platform 215 may receive the feedback automatically (e.g., without user input). For example, analytics platform 215 may obtain log information corresponding to the set of monitored devices 205 to determine whether the predicted events associated with the input ticket occurred. When the predicted events occurred, analytics platform 215 may determine that the ranks and/or set of output tickets were not helpful, and may adjust the model accordingly. For example, analytics platform 215 may adjust a time period in which to identify predicted events, may modify log information to be obtained, may determine attributes to identify that are different than those associated with the predicted events, or the like. In this way, analytics platform 215 automatically adjusts the model based on automatically obtaining log information, which improves accuracy of the model, reduces user involvement in the process, and improves performance of monitored device 205.

In some implementations, analytics platform 215 may receive feedback from administration device 225 associated with a technician. For example, a technician may provide feedback indicating whether the set of output tickets are helpful for resolving the input ticket. As another example, the technician may provide feedback indicating whether the assigned ranks are accurate (e.g., whether a highest-ranked output ticket is most relevant to the input ticket, whether a lowest-ranked output ticket is least relevant to the input ticket, etc.). Analytics platform 215 may update the model based on the feedback. For example, analytics platform 215 may adjust parameters for assigning ranks to output tickets based on probabilities associated with the related events, the underlying events, the predicted events, and/or the input ticket.

In some implementations, analytics platform 215 may receive updated domain information. The updated domain information may identify additional or different relationships between log information and events, between tickets and events, between pairs of tickets, between pairs of events, or the like. For example, a technician may resolve the input ticket based on the log information and based on the set of output tickets. The technician may identify the additional or different relationships based on resolving the input ticket. For example, the technician may identify an event that is related to the input ticket (e.g., an underlying event or a predicted event), may identify other tickets that are related to the input ticket, or the like. The technician may provide updated domain information to cause analytics platform 215 to adjust the model based on the updated domain information. In this way, analytics platform 215 updates the model based on updated domain information, which permits more accurate ranking of output tickets and, thereby, improves performance of monitored devices 205 and/or administration device 225.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6A:
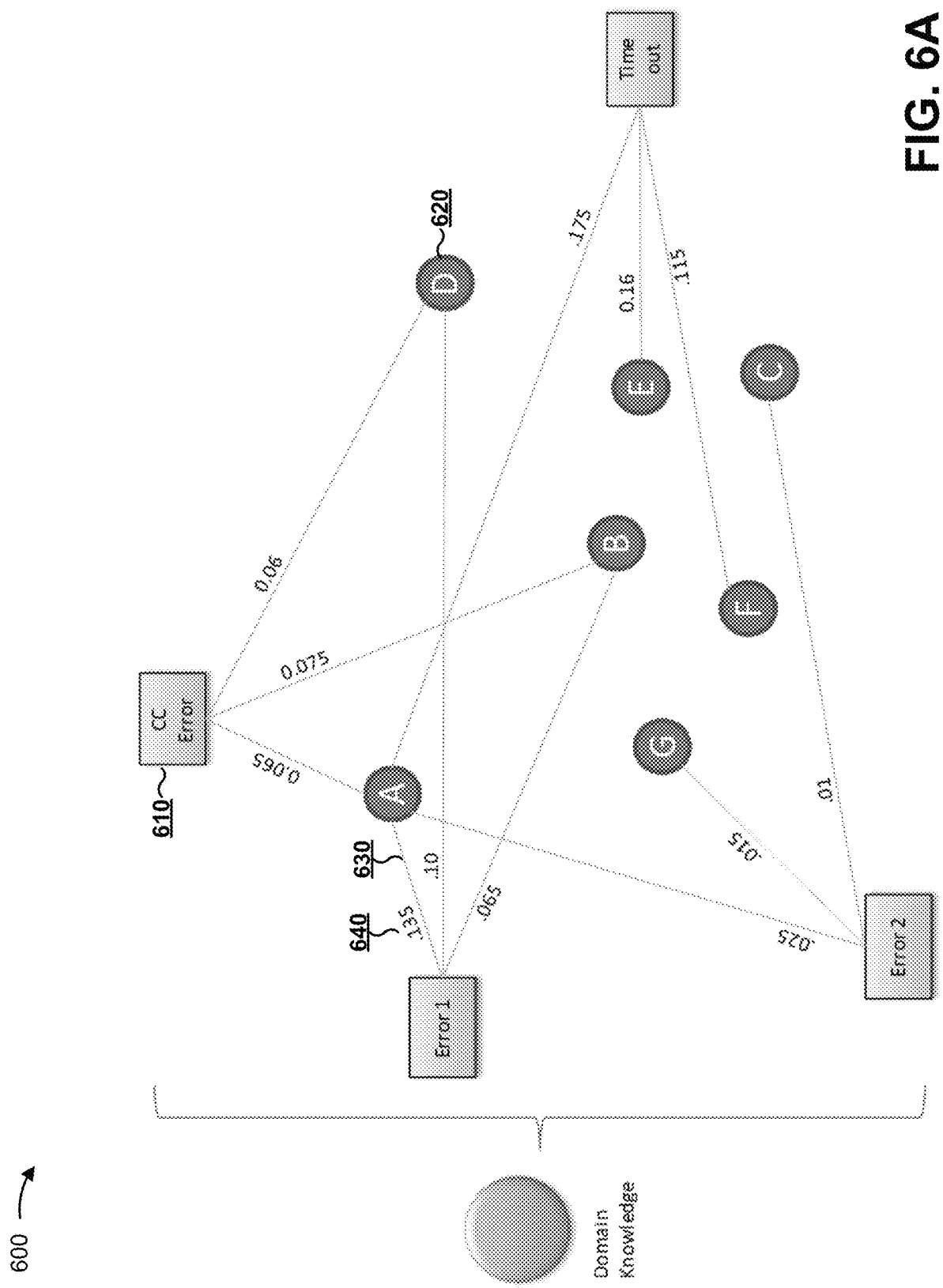
FIGS. 6A and 6B are example implementations of a data structure to be used to rank output tickets with regard to an input ticket.
Figure 6B:
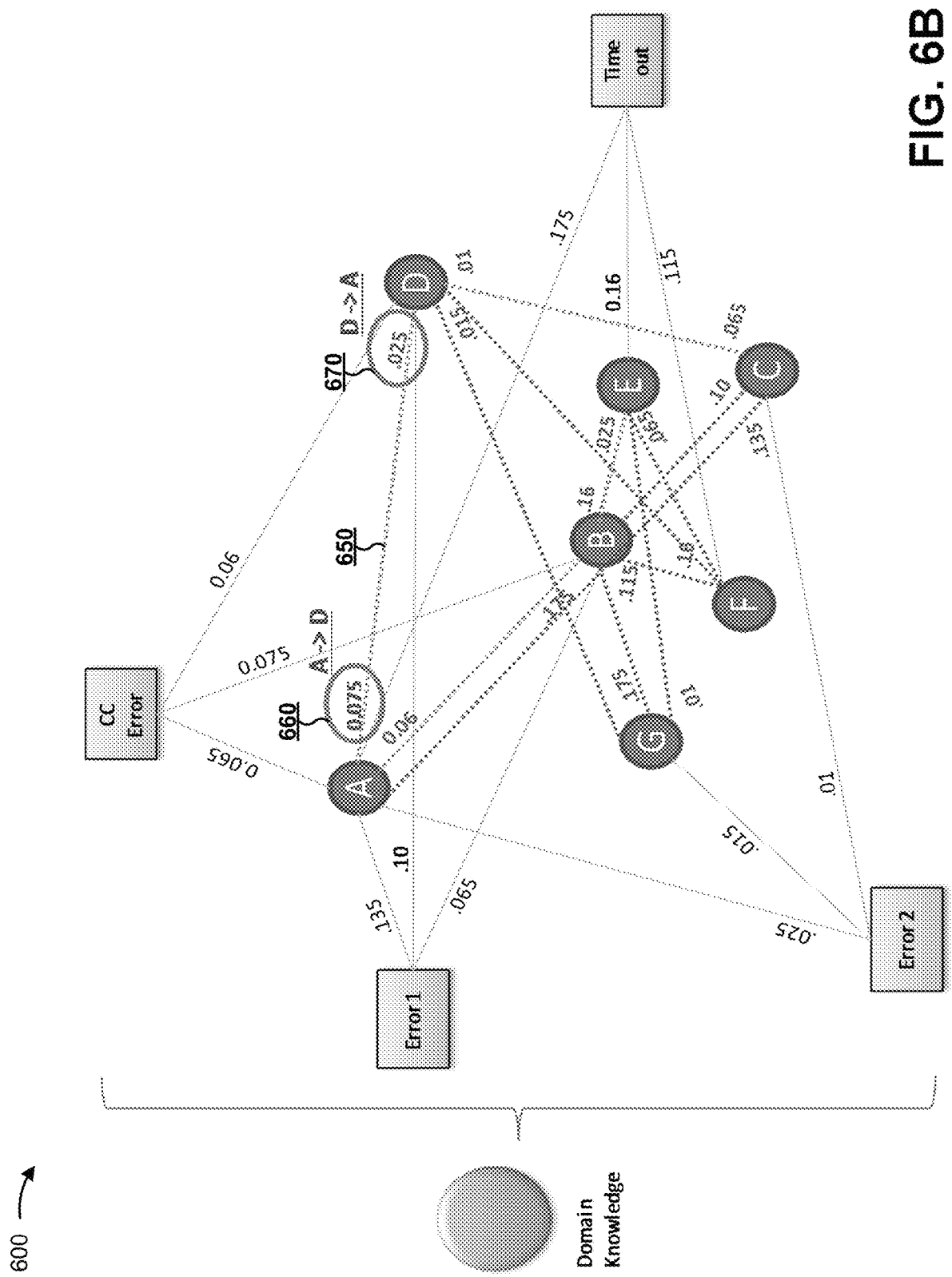

FIGS. 6A and 6B are example implementations of a data structure 600 to be used to rank output tickets with regard to an input ticket. As shown by reference number 610, nodes corresponding to tickets may be shown in FIGS. 6A and 6B by rectangular nodes. Here, the ticket nodes include nodes corresponding to "CC Error," "Time out," "Error 1," and "Error 2" tickets. As shown by reference number 620, nodes corresponding to events may be shown in FIGS. 6A and 6B by circular nodes. Here, the event nodes include nodes corresponding to event A through event G.

As shown by reference number 630, nodes of data structure 600 may be connected by edges. FIG. 6A shows connections between events and tickets associated with the events. As shown by reference number 640, each edge may be associated with a probability value. The probability value may identify a likelihood of co-occurrence of an event and a ticket in a particular time period. For example, edge 640 identifies a 13.5% chance of co-occurrence of an Error 1 ticket and event A in the particular time period. As further shown, each ticket may be associated with multiple, different events. For example, the Error 1 ticket is associated with events A, B, and D.

As shown in FIG. 6B, and by reference number 650, in some cases, event nodes may be connected by edges. As further shown, the event nodes may be connected by directed edges. A directed edge between nodes of two events may identify a likelihood of co-occurrence of the two events. For example, edge 650 between node A and node D identifies a 7.5% probability of occurrence of event D given occurrence of event A (as shown by reference number 660). As another example, edge 650 between node A and node D identifies a 2.5% probability of occurrence of event A given occurrence of event D (as shown by reference number 670).

Based on the edges between ticket nodes and event nodes, and based on the edges between event nodes, analytics platform 215 may determine ranks for output nodes. For example, assume that analytics platform 215 identifies a set of underlying events corresponding to an input ticket based on log information associated with the input ticket. Based on the probability values identified by the edges between tickets and events, and/or based on the probability values identified by the edges between events, analytics platform 215 may rank the output tickets. For example, analytics platform 215 may identify an output ticket that has a highest likelihood of occurring based on probabilities associated with the output tickets and the underlying events.

As another example, analytics platform 215 may identify one or more predicted events based on data structure 600 as shown in FIG. 6B, and may identify an output ticket that has a highest likelihood of occurring based on probabilities associated with the output tickets, the underlying events, and the predicted events. Analytics platform 215 may identify a predicted event based on data structure 600. For example, assume that analytics platform 215 identifies underlying events including events A, C, F, and G. In that case, analytics platform 215 may identify event D as a predicted event based on the probability values of the edges between nodes A and D, nodes C and D, nodes D and F, and nodes G and F. Analytics platform 215 may then assign ranks to the output tickets (e.g., CC Error, Error 1, Error 2, and Time Out) based on the probabilities identified by the edges between the ticket nodes and nodes A, C, D, F, and G.

In this way, analytics platform 215 ranks output tickets based on sets of underlying events and/or predicted events associated with an input ticket, which improves remediation of issues associated with the input ticket and reduces computing resource consumption based on errors or misconfiguration with regard to monitored devices 205. Further, by ranking output tickets based on likelihood of occurrence with regard to the underlying events and/or predicted events, analytics platform 215 enables preemptive remediation of events associated with the output tickets, which improves functionality of monitored devices 205 and conserves computational and organizational resources that would otherwise be used to address the output tickets as they are generated.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive a first sample;
identify a plurality of second samples that are similar to the first sample,
the plurality of second samples corresponding to service tickets that have previously been processed;
obtain or determine log information identifying a plurality of events associated with the first sample;
determine respective probabilities of occurrence corresponding to the plurality of second samples, a probability of occurrence, for a particular second sample, identifying a likelihood of receiving a corresponding service ticket within a particular time period of occurrence of the plurality of events;

assign ranks to the plurality of second samples based on the respective probabilities of occurrence; and provide information identifying the ranks and the plurality of second samples.

2. The device of claim 1, where the plurality of events occur prior to receiving the first sample, the first sample corresponding to a service ticket generated based on at least one of the plurality of events.

3. The device of claim 2, where the plurality of events is a plurality of first events; and where the one or more processors are to:
identify one or more second events based on the plurality of first events,
the one or more second events being predicted to occur after the first sample is received.

4. The device of claim 1, where the log information is first log information; and where the one or more processors, when determining the respective probabilities of occurrence, are to:
determine the respective probabilities of occurrence based on second log information associated with the plurality of second samples,
the second log information identifying historical events associated with the service tickets corresponding to the plurality of second samples.

5. The device of claim 4, where the one or more processors are further to:
train a model based on the second log information and the service tickets corresponding to the plurality of second samples,
the model to receive, as input, the first log information and the plurality of second samples, and
the model to output information identifying the respective probabilities of occurrence.

6. The device of claim 5, where the one or more processors are further to:
receive feedback regarding the respective probabilities of occurrence or the ranks assigned to the plurality of second samples; and
update the model based on the feedback.

7. The device of claim 1, where the one or more processors are further to:
identify the plurality of events based on the log information,
the plurality of events being identified based on attributes of the log information corresponding to the plurality of events, and
the log information being determined based on runtime logs associated with one or more monitored devices.

8. The device of claim 1, where the one or more processors, when determining the respective probabilities of occurrence, are to:
determine the respective probabilities of occurrence based on a data structure,
the data structure including nodes corresponding to the plurality of second samples and the plurality of events, and
the data structure including edges between the nodes, each edge, of the edges, corresponding to a different pair of nodes of the nodes; and
each edge identifying a likelihood of co-occurrence of one or more events and one or more second samples that are associated with the corresponding pair of nodes.

9. A method, comprising:
receiving, by a device, an input sample corresponding to an input service ticket;
identifying, by the device, a plurality of output samples that are similar to the input sample,
the plurality of output samples being selected from historical service tickets that have previously been processed;
obtaining or determining, by the device, log information identifying a plurality of events associated with the input sample;
determining, by the device, respective probabilities of occurrence corresponding to the plurality of output samples,
a probability of occurrence, for a particular output sample of the plurality of output samples, identifying a likelihood of receiving a corresponding service ticket within a particular time period of occurrence of the plurality of events;
assigning, by the device, ranks to the plurality of output samples based on the respective probabilities of occurrence; and
providing, by the device, information identifying the ranks and the plurality of output samples.

10. The method of claim 9, where the plurality of events is a plurality of first events; and where the method further comprises:
identifying a plurality of second events,
the plurality of second events including events that are predicted to occur within the particular time period based on the plurality of first events, and
the plurality of second events being identified based on historical events associated with the historical service tickets.

11. The method of claim 10, where identifying the plurality of second events comprises:
identifying a set of historical events and a particular historical event,
the particular historical event having occurred after the set of historical events; and
identifying a set of first events, of the plurality of first events, corresponding to the set of historical events; and
predicting a particular second event, of the plurality of second events, based on identifying the set of first events.

12. The method of claim 11, where the log information is first information; and where the set of historical events is identified based on second log information corresponding to the historical service tickets.

13. The method of claim 9, where identifying the plurality of output samples comprises:
identifying the plurality of output samples based on at least one of:
semantic similarity between the input sample and the plurality of output samples,
keyword matching between the input sample and the plurality of output samples, or
a temporal relationship between the input sample and the plurality of output samples.

14. The method of claim 9, where the device is a first device; and where the plurality of events are associated with a second device; and where the method further comprises:
reconfiguring the second device based on the plurality of output samples.

15. The method of claim 9, where assigning the ranks to the plurality of output samples comprises:
assigning the ranks to the plurality of output samples in an order corresponding to values of the probabilities of occurrence,
a highest rank being assigned to an output sample, of the plurality of output samples, with a highest probability of occurrence of the probabilities of occurrence.

16. A non-transitory computer-readable medium storing instructions, the instructions comprising:
one or more instructions that, when executed by one or more processors, cause the one or more processors to:
receive a first sample;
identify a plurality of second samples that are similar to the first sample,
the plurality of second samples being selected from historical service tickets that have previously been processed;
identify a plurality of events associated with the first sample based on log information for a device associated with the plurality of events;
determine respective probabilities of occurrence corresponding to the plurality of second samples,
a probability of occurrence, for a particular second sample, identifying a likelihood of receiving a corresponding service ticket within a particular time period of occurrence of the plurality of events;
assign ranks to the plurality of second samples based on the respective probabilities of occurrence; and
provide information identifying the ranks and the plurality of second samples.

17. The non-transitory computer-readable medium of claim 16, where the one or more instructions, that cause the one or more processors to determine the respective probabilities of occurrence, cause the one or more processors to:
determine the respective probabilities of occurrence based on information identifying historical events associated with the historical service tickets corresponding to the plurality of second samples.

18. The non-transitory computer-readable medium of claim 17, where the one or more instructions, when executed based on the one or more processors, further cause the one or more processors to:
train a model based on the information identifying the historical events and the service tickets corresponding to the plurality of second samples,
the model to receive, as input, the log information and the plurality of second samples, and
the model to output information identifying the respective probabilities of occurrence.

19. The non-transitory computer-readable medium of claim 18, where the one or more instructions, when executed by the one or more processors, further cause the one or more processors to:
receive feedback regarding the respective probabilities of occurrence or the ranks assigned to the plurality of second samples; and
update the model based on the feedback.

20. The non-transitory computer-readable medium of claim 16, where the one or more instructions, that cause the one or more processors to determine the respective probabilities of occurrence, cause the one or more processors to:
determine the respective probabilities of occurrence based on a data structure,
the data structure including nodes corresponding to the plurality of second samples and the plurality of events, and
the data structure including edges between the nodes,
each edge, of the edges, corresponding to a different pair of nodes of the nodes, and
each edge identifying a likelihood of occurrence, within the particular time period, of one or more events and one or more second samples that are associated with the corresponding pair of nodes.

* * * * *